March 9, 1965  J. W. GRAHAM ETAL  3,172,292
PRESSURE CHAMBER SYSTEM
Filed Sept. 1, 1961  3 Sheets-Sheet 1
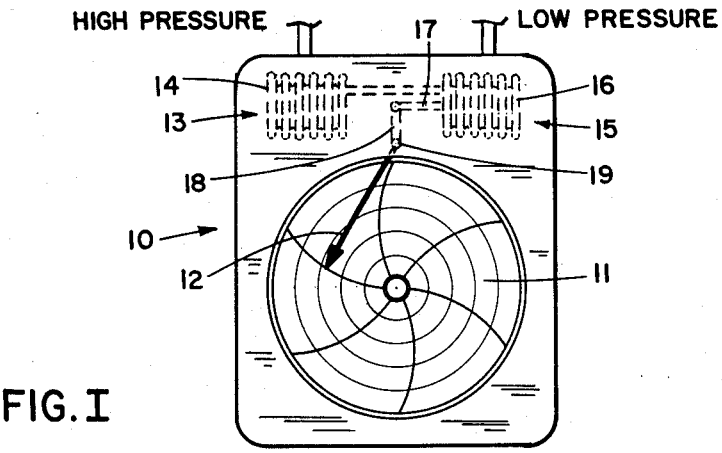
FIG. I
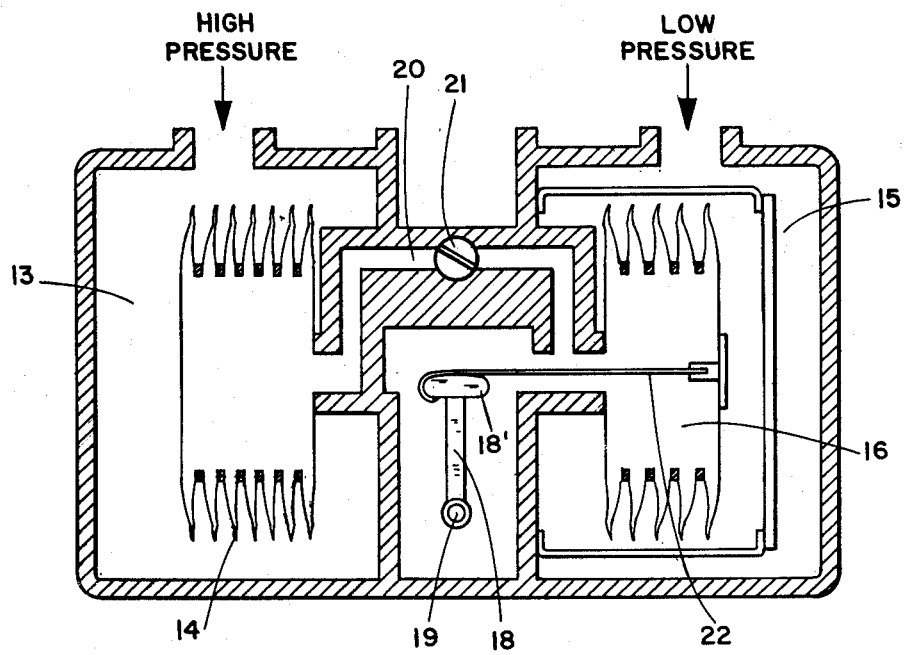
FIG. II
INVENTORS
JAMES W. GRAHAM
BY HOEL L. BOWDITCH
AGENT

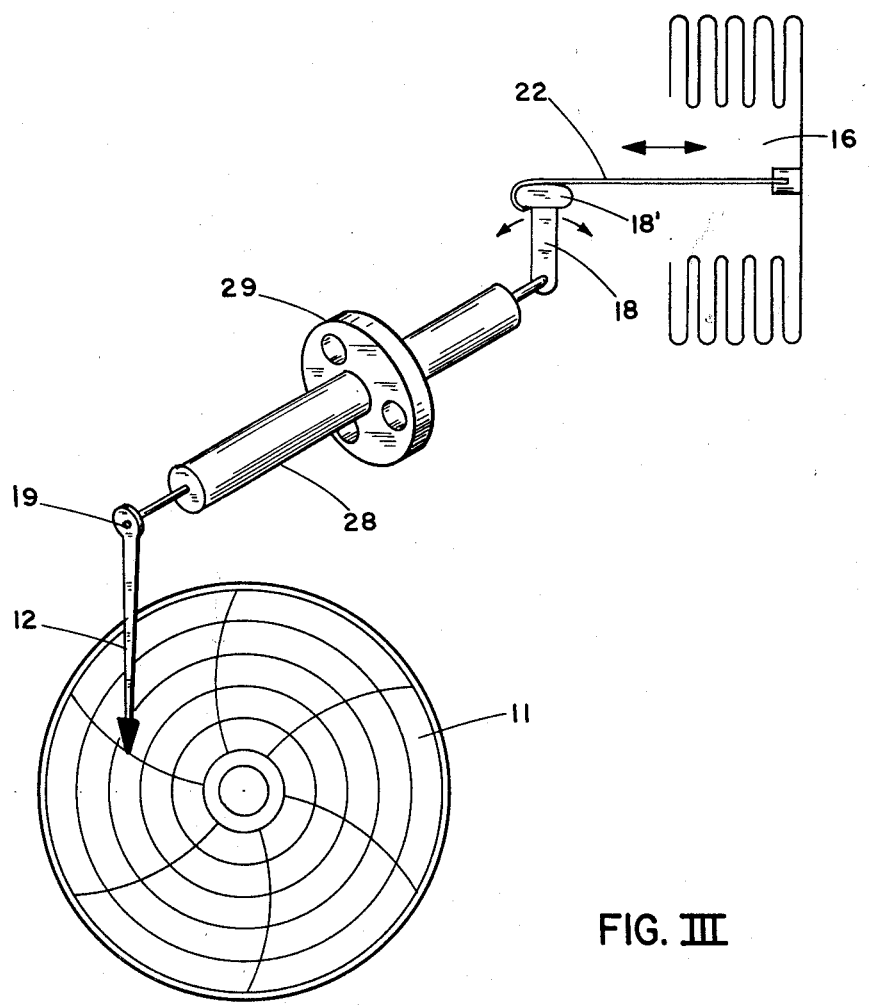

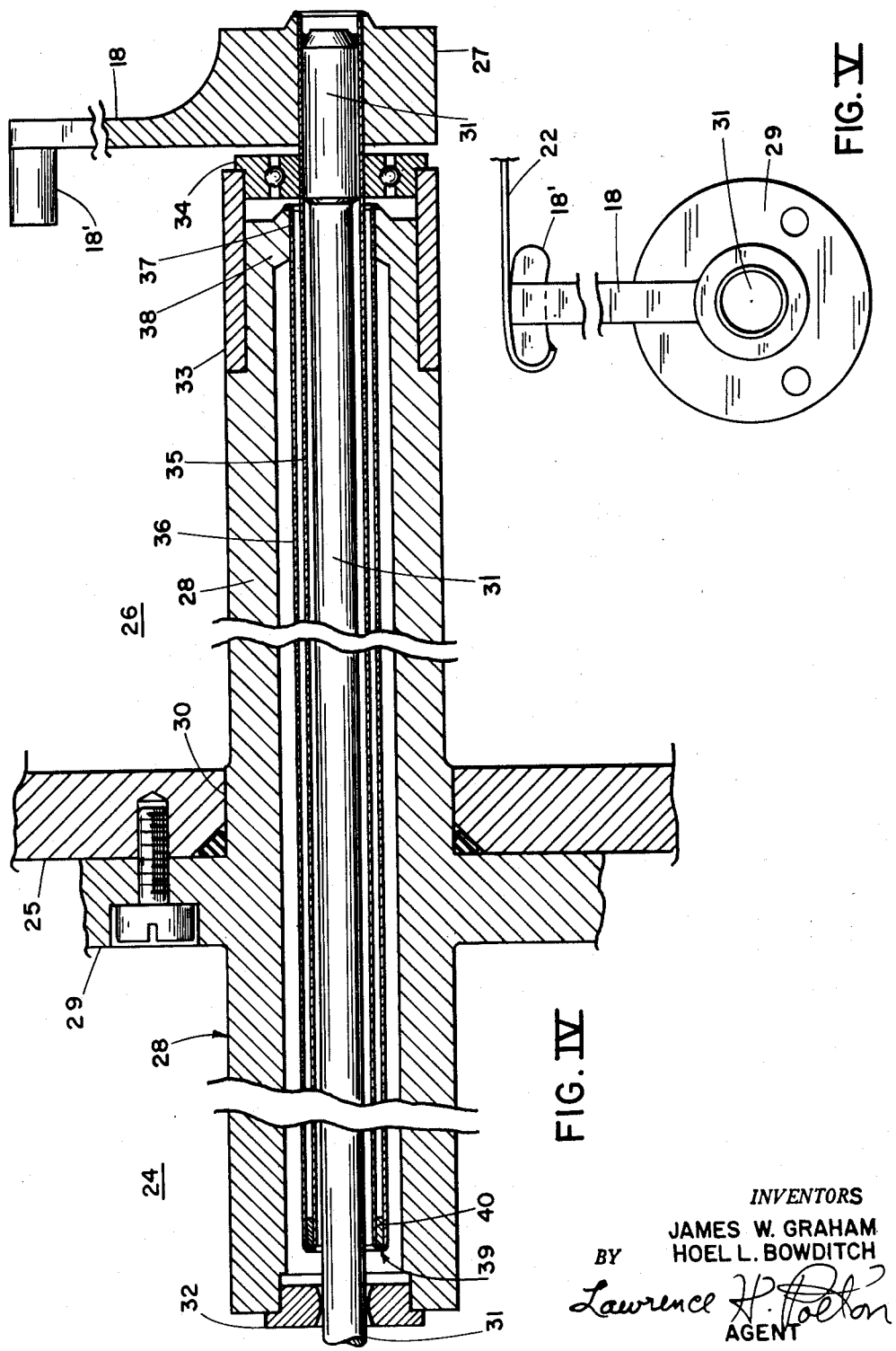

United States Patent Office 3,172,292
Patented Mar. 9, 1965

3,172,292
PRESSURE CHAMBER SYSTEM
James W. Graham and Hoel L. Bowditch, Foxboro, Mass., assignors to The Foxboro Company, Foxboro, Mass., a corporation of Massachusetts
Filed Sept. 1, 1961, Ser. No. 135,646
1 Claim. (Cl. 73—410)

This invention relates to pressure chambers wherein mechanical movements result from pressure variations therein, and wherein means is provided for transferring such mechanical movements to the outside of the housing through a sealed aperture in the housing.

This invention is particularly concerned with a device wherein the mechanical movement inside the housing is essentially a line movement and the transferrence of this line movement to the outside of the pressure housing is essentially in terms of rotary movement.

Modern demands on devices of this nature require both a more positive output response with respect to the input movement, and a greater degree of movement, in this case in terms of actual degrees of arc of rotation, than has been possible in the past with prior art structures.

In this invention a new and useful structural combination is provided for these purposes and to meet the above requirements. This combination uses a torque tube assembly extending from within a pressure housing through a wall thereof to an outside terminus which may be used for any desired instrumentation purpose, for example, as an indicator movement.

In this invention the torque tube assembly uses a central rigid bar, more rigid than prior art bars of this general nature, so that movement is transmitted through such a bar with essentially zero twist in the bar itself. In addition, this bar is surrounded by a torsionally very flexible double sleeve of material designed to present minimum interference to the rotation of the bar and provide greatest possible span or total arc of rotation in the operation of the device.

One application of a device according to this invention is with respect to a differential pressure unit which for example may be applied to the measurement of flow in relation to pressures taken on either side of an orifice plate in a flow line. In this manner, high and low pressure readings are led into a differential unit to result in a mechanical movement in representation of this differential, this movement being within a pressure housing and thereafter transferred through the wall of the housing without leakage, to provide an outside movement in representation of this inside movement and the pressure differential.

It is therefore an object of this invention to provide a new and improved pressure device with mechanical movement extraction therefrom.

Other objects and advantages of this invention will be in part apparent and in part pointed out hereinafter in the accompanying specification and claim, and in the drawings, in which:

FIGURE I is a representation of a recording instrument for use with a torque tube pressure device according to this invention;

FIGURE II is a central sectional schematic of a differential pressure device with mechanical movement transfer to the outside thereof, in accordance with this invention;

FIGURE III is an enlarged schematic showing of the mechanical motion and transfer involved in and from the pressure unit of FIGURE II;

FIGURE IV is a longitudinal central section showing of a torque tube assembly according to this invention; and FIGURE V is a right-hand end view of FIGURE IV as seen in the drawings, as if FIGURE IV were not sectioned.

In FIGURE I an illustrative embodiment of this invention is indicated by a recording instrument 10. This is provided with a rotary chart 11, and a pen arm 12 movable essentially radially of the chart by a variable condition such as a pressure change in the usual manner for such devices.

A fanciful indication of the direct application of this invention is shown in FIGURE I by dotted line indications of a high pressure section 13 involving a bellows 14 and a low pressure section 15 involving a bellows 16.

Differential pressure response is indicated as a mechanical movement through a dotted line 17, representing a flat, flexible tape. A translation arm 18 is attached to the movement member 17 to change the effective straight line movement 17 to rotary movement at a pivot 19. The arm 18 is a curved sector member over which the tape is wound, changing the effective length of the tape. This structure provides a linearity factor for this device. This pivot involves a transfer of mechanical movement out of a pressure housing as will be seen hereinafter to result in an arcuate movement outside of the pressure housing of the pen arm 12 in accordance with the variable condition; that is the differential pressure between the high and low pressure areas 13 and 15.

FIGURE II sets forth schematically in more detail, the arrangement of the pressure areas 13 and 15, and the bellows 14 and 16, in the manner usual to such differential pressure housing arrangements. Such a device may, for example, operate with respect to the measurement of flow wherein an orifice plate in a flow arrangement (not shown), is installed in a flow line. Pressure taps are taken upstream and downstream of the orifice plate, and these taps are led to the high pressure and low pressure indicated areas in the systems of FIGURES I and II.

Thus the differential pressure across an orifice plate is determined and indicated on a chart. The bellows 14 and 16 are filled with the same fluid and have a connecting passage therebetween as at 20 with a restrictor 21 for adjustment of flow therethrough. This fluid may for example be a combination of ethylene glycol and water, with water in a minor quantity. The high and low pressure areas 13 and 15 are otherwise isolated from each other.

The resultant effect of the high and low pressure conditions is a relative movement between the bellows 14 and 16 in the form of movement of a tape 22 in an essentially straight line. The tape is connected to the movable face of the bellows 16 and extending inwardly of the device. The tape 22 moves essentially in a straight line in accordance with the differential between the high and low pressures of the housing. In the operation of the device the effective length of the tape is varied in the bellows movement. The inner end of the flat flexible metal tape 22 is secured to the translation sector arm 18 lying on a matching convex, top surface of the sector 18. A torque tube assembly is indicated by an end view as at 19, indicating a tubular assembly perpendicular to and downward from the drawing. This is a means by which the essentially straight line movement of the tape 22 is transferred out of the pressure housing and translated into a rotary motion about a fixed axis, essentially to be applied to the recorder arm 12 as in FIGURE I. This device will have equal increments of rotary motion for equal increments of linear motion of the bellows 16.

Temperature compensation means may be applied to this device, for example by forming a sector arm 18 of a high expansion material, such as aluminum or a suitable bimetal form as a radius, span adjustment device, operable with temperature changes. The movable tape 22 may be at least in part, formed for temperature compensation in like manner, to provide a zero adjustment in terms of temperature change and the resultant bellows motion. Further, the torque tube may be formed of a nickel-iron alloy whose spring rate increases with temperature, to provide the required equal increments of linear motion through the essentially constant resistance to rotation of the rigid bar which is inherent in the spring rate increase with temperature.

FIGURE III is an illustration of the mechanical movement system of the structures of FIGURES I and II enlarged to illustrate more clearly the different movements involved. In this situation, like elements have been represented by like reference numerals.

FIGURES IV and V illustrate the torque tube assembly according to the combination of this invention. As in FIGURE IV for example, the torque tube assembly extends from within the pressure housing, in the general area indicated by 26, through the housing wall 25 to the general exterior area, indicated at 24 outside the pressure housing. The inner end terminates in a hub 27 on which the sector 18 is mounted. The inner area 26 is an enclosed volume within the pressure housing, that includes the interior of the two bellows and the connecting passage therebetween. That is, the torque assembly is a part of a mechanical movement transmittal from the fluid pressure ambiency within the bellows to the outside of the housing.

This torque tube assembly has particular advantages; long effective length embodied in a short overall length, rigidity of the central rod, and flexibility of the double tube arrangement about the rod. For a given length this double tube device may be formed with a spring rate of the order of one half the spring rate of a comparable single tube device.

Major improvements provided by this invention are made possible through inventive choice of material and design. By providing a double torque tube system this invention essentially halves the spring rate of a conventional tube system. The special form and material of the central shaft provides an increased spring rate therein of the order of three.

Thus this invention provides an improvement factor of the order of six in the spring rate ratio between tubes and shaft. Accordingly greater rotation is provided with the same torque and with less loss through twist in the shaft itself.

Thus the spring rate of the shaft is balanced against the spring rate in the tubes to give maximum power transfer.

The power capabilities of this invention provide for the mounting of an operating load on the output of the system much greater than that of the usual simple indicator or pen.

In the torque tube arrangement, there is an overall housing 28 which acts as a support and pressure containment. It is provided with an integral circumferential boss 29 by which the tubular housing 28 is mounted to the pressure housing wall 25 through the opening therein 30 in pressure sealed arrangement therewith. Thus, a substantial part of the overall torque tube unit is within the pressure housing and a substantial part without the pressure housing.

The torque tube rod which is disposed essentially axially longitudinally of the device as at 31 is formed of material which is torsionally very rigid and resistant to twist. For example, sintered tungsten carbide. The central rod 31 extends throughout the length of the overall torque tube assembly and out of both ends thereof so that the interior end in the area 26 may be secured to the sector arm 18 (FIGURE I) and the outer end in the area 24 may support the recorder pen arm 12.

At the outer end of the torque tube housing, 28, a bearing 32 is provided for rotation of the rod 31 therein. This bearing 32 may be of any suitable light friction material. The bearing 32 is fixed in the outer end of the housing 28 and contains the rod 31 therein, for rotation with respect thereto. This is not primarily a pressure seal, merely a support bearing and is a simple bearing which is subjected to atmospheric impurities, such as dirt particles.

The inner end of the torque tube housing 28 located in area 26 has mounted thereon a bearing support sleeve 33 and a ball bearing 34 is mounted in this sleeve 33. This ball bearing is made possible because the structure is contained in the fluid body which lies within the bellows and is not subjected to atmospheric impurities.

The ball bearing 34 supports the inner end of the rigid central shaft 31 for rotation therein just inside the inner end portion of the shaft 31 to which the hub 27 is connected. The rigid rod 31 has an enlarged diameter inner end, which supports the hub 27 and the bearing 34. The sector 18' of the sector 18 is located beneath and in line with the bearing 34 and operates in an arc in a plane perpendicular to FIGURE IV and including both the sector 18' and the bearing 34 to avoid non-axial torque on the shaft 31. The remainder of the rigid shaft 31 is reduced in diameter, which formation provides radial clearance with respect to a radially inner torque tube 35. The free end of the tube 35 faces the inner direction of this device to the right as seen in FIGURE IV. This inner tube free end is secured to and about the rigid shaft 31 and held between the shaft 31 and the bearing 34 in a pressure tight sealed relationship with both the rigid rod and the bearing.

Again as seen in FIGURE IV, an outer torque tube 36 has its free end adjacent to the free end of the inner tube 35 and facing inwardly to the right, as in the drawing, with this inner end secured, as at 37 in a ring mounting pressure seal to a radially inwardly extending boss 38 which is an integral part of the overall housing 28.

The inner and outer torque tubes indicated at 35 and 36 are both parts of one single structure; that is, a double tube with one tube within the other and longitudinally essentially coextensive therewith. The right hand ends are ordinarily open and free. In assembly, they are sealed as has been described above. The left hand ends are joined as indicated at 39 with a suitable joining ring and spacer body 40 therein, to maintain the separation between the inner and outer tubes proper and sufficient to allow the desired twisting without actual engagement contact between the two tubes.

The torque tubes are made of material picked for ability to stand corrosive atmospheres and to have high strength with reasonable flexibility. The material may also be chosen to have a controlled spring rate change with temperature. A material that meets these general requirements might be an iron-nickel alloy.

The diameters and lengths involved are preferably chosen to optimize for the desired operating condition. The spacings between the shaft and the inner torque tube, and between the inner torque tube and the outer torque tube, are of the order of five thousandths of an inch, each.

The overall double torque tube has a rather substantial clearance betwen the outer torque tube radially speaking, and the inner tubular wall of the general housing 28. This may be of the order of four hundredths of an inch. The overall length dimension of the assembly may be in the order of five to six inches. The outer diameter of the housing 28 may be of the order of one half inch. This device provides for total bellows movement of the order of one half inch, including overrange movement. This may result in torque tube rotation of forty degrees of arc. The operating movement and arc may be of the order of sixty to seventy-five percent of these overrange actions. Thus, the torque tube assembly may be; a double wall tube, a tube within a tube wherein the entire body of the tube is the same piece of material bent back on itself—turned inside-out so to speak, or, the double tube may be formed by a single tube within another tube and thereafter joining the peripheries of these two tubes at one end of the assembly. The material of the tubes may be the same or may be different, according to the best degree of possible flexibility on a torsion basis, with consideration for the desirable condition of constant modulus of elasticity with temperature. A useful tube material for example, is an iron-nickel alloy.

Thus, this invention provides a compact, small length, small diameter torque tube assembly with a large angular possible deflection and a rigid center rod, so as to produce output motion in response to input motion with a minimum error due to the twisting of the central rod.

*General discussion*

A torque tube may be used as a rotary seal out of a pressurized enclosure. Thus, means is provided for conducting rotary motion through a wall while maintaining a pressure seal. This means may comprise nested tubes with a shaft through the center. A rotary motion on the inner end of the shaft will cause the tubes to rotate and let the shaft transmit the desired torque to achieve the desired movement. This design can be provided with various spring rates, large angular rotations, and seal against high pressures.

Accordingly, with this invention, the mechanical output from a pressure chamber may have a load applied thereto, to operate devices or transmit signals, and is not limited to indicators or simple recorders.

In the design of the torque tube of this invention, consideration has been given to stresses in the tube caused by pressure and rotation, as well as the torque which the shaft can transmit.

The stress in the torque tube is a combination of the tensile stresses caused by pressure, and the shear stresses caused by rotation. These stresses are combined to find the maximum tensile stress. Factors involved are: pressure, tube radius, wall thickness, torsional modulus, tube length, and rotational twist.

Maximum tensile stress is a value determined by the material used and the above factors and can be calculated.

Consideration is given to stability of the tubes as a design factor in that outside pressure may collapse a tube from instability well below the pressure necessary to overstress the tube material.

The torsional spring rate of the torque tube is taken on the basis of torsional modulus, tube radius, wall thickness, and length. The torsional spring rate of the rod is taken on the basis of torsional modulus of the rod, rod length, and rod radius.

Consideration is also given to the calculation of torque (power). One specification of a measuring device is the torque the device can work against without causing a given error, for example, one percent. This is usually expressed as gram-centimeters per percent. Thus, recorder pen power is calculated for a given set of conditions and the torque tube designed for maximum power.

The factors of optimizing the recorder torque tube are: actual pen radius, chart width, force for one-hundred percent motion, as force on a bellows for example, torque tube spring rate, rod spring rate, in a bellows device the spring rates of the bellows and any associated mechanisms and the radial length of the arm connecting the bellows to the torque tube.

Usually all of the above factors will be fixed except the torque tube and shaft spring rates. The selected radii and length of tubes and shaft are factors in these spring rates. Thus in a recorder, pen power versus the radius of the torque tube shaft may be plotted for various force input levels and torque tube length.

This invention therefore provides a new and improved pressure housing system. As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

We claim:

A pressure chamber system including mechanical means for transferring mechanical movement from a pressure responsive device inside a pressure housing to the outside of said pressure housing, said mechanical means comprising:

a tubular chamber having an inner bore long compared to its diameter, a flange concentric with the outer surface of said tubular chamber and fixedly mounted thereto forming a seal with said outer surface for providing a removable air-tight mounting to said pressure housing thereby inserting one end of said chamber into a non-atmospheric pressure environment within said pressure housing, a simple bearing adapted to function at atmospheric pressure and normal atmospheric contamination ranges having its perimeter integrally mounted to the atmospheric end of said tubular chamber and having its axis coincident with the axis of said tubular chamber, a ball bearing having its perimeter mounted to a lip extending longitudinally from said tubular chamber at its non-atmospheric pressure end and having its axis coincident with the axis of said tubular chamber, a sintered tungsten-carbide shaft located within and extending through said tubular chamber and having its axis coincident with the axis of said tubular chamber and having its atmospheric end movably mounted within and extending through said simple bearing providing thereby a means of axial motion output at atmospheric pressure at the atmospheric termination of said shaft and having the non-atmospheric pressure end of said shaft extending beyond the non-atmospheric end of said tubular chamber and through said ball bearing axially therewith and said shaft having an enlarged diameter at and within said ball bearing extending to its non-atmospheric pressure termination, a lever arm one end fixedly mounted to the non-atmospheric pressure termination of said shaft having a provision for receiving motion from said pressure responsive device within said pressure housing located at the other end of said lever and disposed in the plane of said ball bearing to avoid non-axial torque, an inner torque tube sleeve concentric with said shaft disposed within and through one end of said tubular chamber having the end extending through said tubular chamber fixedly and concentrically mounted with said enlarged diameter of said shaft forming a pressure seal therewith with the outer surface of said sleeve adjacent to said enlarged diameter of said shaft mounted to the inner ring of said ball bearing and said sleeve extending concentrically with said shaft in a spaced relationship therewith substantially through said tubular chamber to a point short to said simple bearing and said sleeve material comprised of nickel-iron alloy to provide a variable spring rate with temperature such that a substantially constant shaft resistance to rotation obtains throughout operating temperature ranges whereby equal output increments are achieved with equal input increments over said operating temperature ranges, spacing means at the termination of said inner torque tube sleeve nearest said simple bearing mounted outwardly concentric therewith and fixed thereto in a sealed relationship, and an outer torque tube sleeve concentric with said inner torque tube sleeve having one end mounted concentrically with said spacing means and fixed thereto in a sealed relationship extending through said tubular chamber in a spaced concentric relation with said inner torque tube sleeve and mounted fixedly at its other end to an inward extension into the bore of non-atmospheric pressure and of said tubular chamber forming a seal therewith and said sleeve material comprised of nickel-iron alloy to provide a variable spring rate with the temperature such that a substantially constant shaft resistance to rotation obtains throughout operating temperature ranges.

References Cited by the Examiner
UNITED STATES PATENTS

| 278,910 | 6/83 | Emery | 73—408 |
|---|---|---|---|
| 3,040,582 | 6/62 | Lorenz | 73—393 X |

FOREIGN PATENTS

| 1,183,176 | 1/59 | France. |
|---|---|---|

OTHER REFERENCES

Barton Instrument Corp., Monterey Park, Calif., Bulletin 224–2, June 17, 1960.

RICHARD C. QUEISSER, *Primary Examiner.*

ROBERT EVANS, JOSEPH P. STRIZAK, *Examiners.*